(12) United States Patent
Wilde

(10) Patent No.: US 11,800,327 B2
(45) Date of Patent: Oct. 24, 2023

(54) SYSTEMS AND METHODS FOR SHARING INFORMATION BETWEEN AUGMENTED REALITY DEVICES

(71) Applicant: Navitaire LLC, Minneapolis, MN (US)

(72) Inventor: Justin Steven Wilde, Salt Lake City, UT (US)

(73) Assignee: NAVITAIRE LLC, Minneapolis, MN (US)

( * ) Notice: Subject to any disclaimer, the term of this patent is extended or adjusted under 35 U.S.C. 154(b) by 833 days.

(21) Appl. No.: 16/197,324

(22) Filed: Nov. 20, 2018

(65) Prior Publication Data
US 2020/0162851 A1   May 21, 2020

(51) Int. Cl.
*H04W 4/06* (2009.01)
*H04B 10/114* (2013.01)
*G06T 19/00* (2011.01)

(52) U.S. Cl.
CPC .......... *H04W 4/06* (2013.01); *G06T 19/006* (2013.01); *H04B 10/1149* (2013.01); *G06T 2219/024* (2013.01)

(58) Field of Classification Search
CPC .... H04W 4/06; H04B 10/1149; G06T 19/006; G06T 2219/024

USPC ......................................................... 370/312
See application file for complete search history.

(56) References Cited

U.S. PATENT DOCUMENTS

| | | | | |
|---|---|---|---|---|
| 2009/0023435 A1* | 1/2009 | Kuivalainen | ........... | H04L 29/06 455/419 |
| 2011/0312303 A1* | 12/2011 | Brush | ..................... | H04M 3/38 455/414.1 |
| 2020/0041348 A1* | 2/2020 | Kusukame | ................ | G01J 5/10 |

* cited by examiner

*Primary Examiner* — Gbemileke J Onamuti
(74) *Attorney, Agent, or Firm* — FINNEGAN, HENDERSON, FARABOW, GARRETT & DUNNER LLP

(57) ABSTRACT

Methods systems, and computer-readable storage media for sharing information between a source augmented reality device and a receiving augmented reality device. The method including detecting, using an infrared device of the source augmented reality device the presence of the receiving augmented reality device. The method further establishing a connection between the source augmented reality device and the receiving augmented reality device. When a connection is established, the method sharing information for displaying in a field of view of the source augmented reality device and a field of view of the augmented reality device.

20 Claims, 9 Drawing Sheets

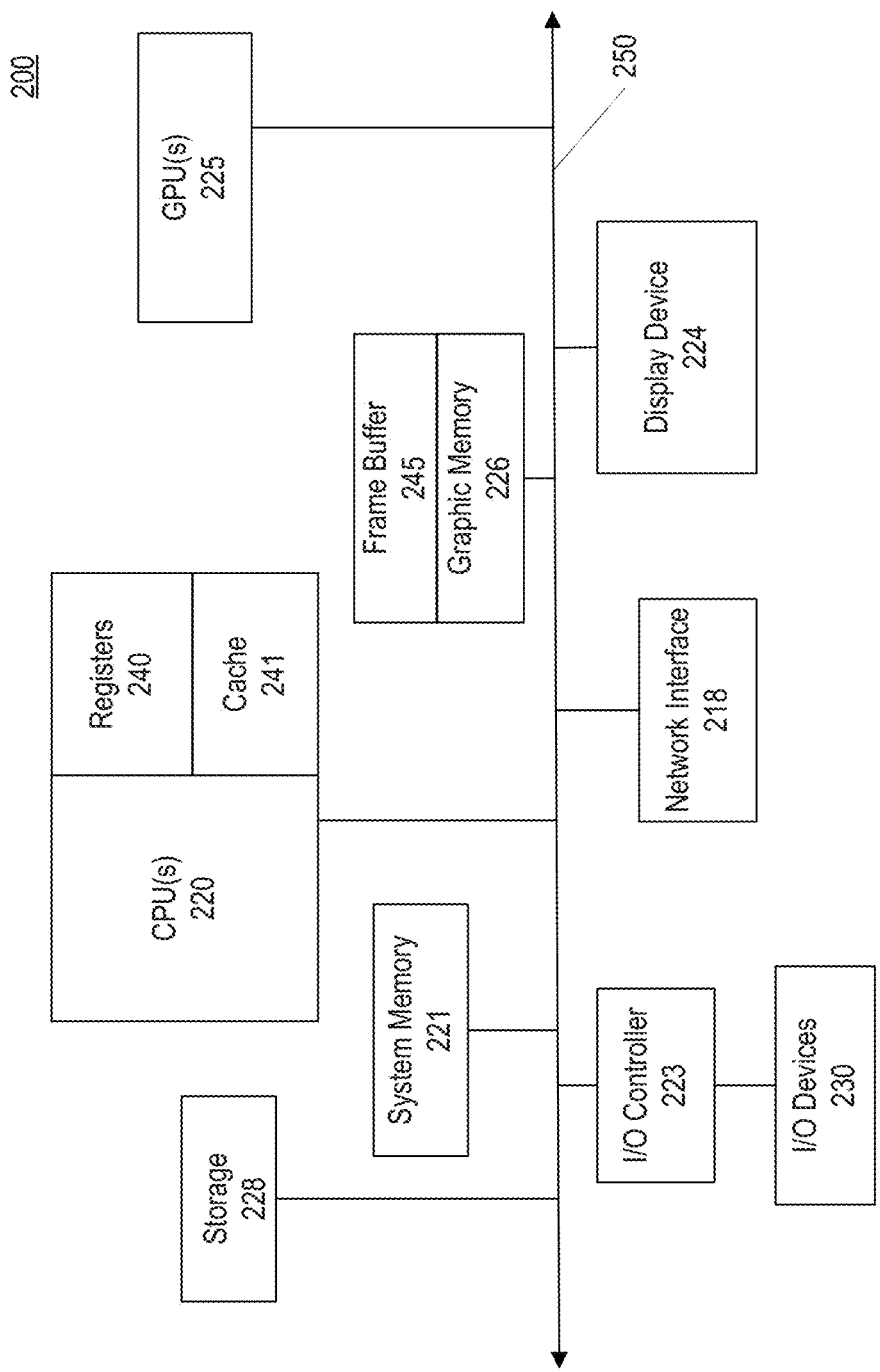

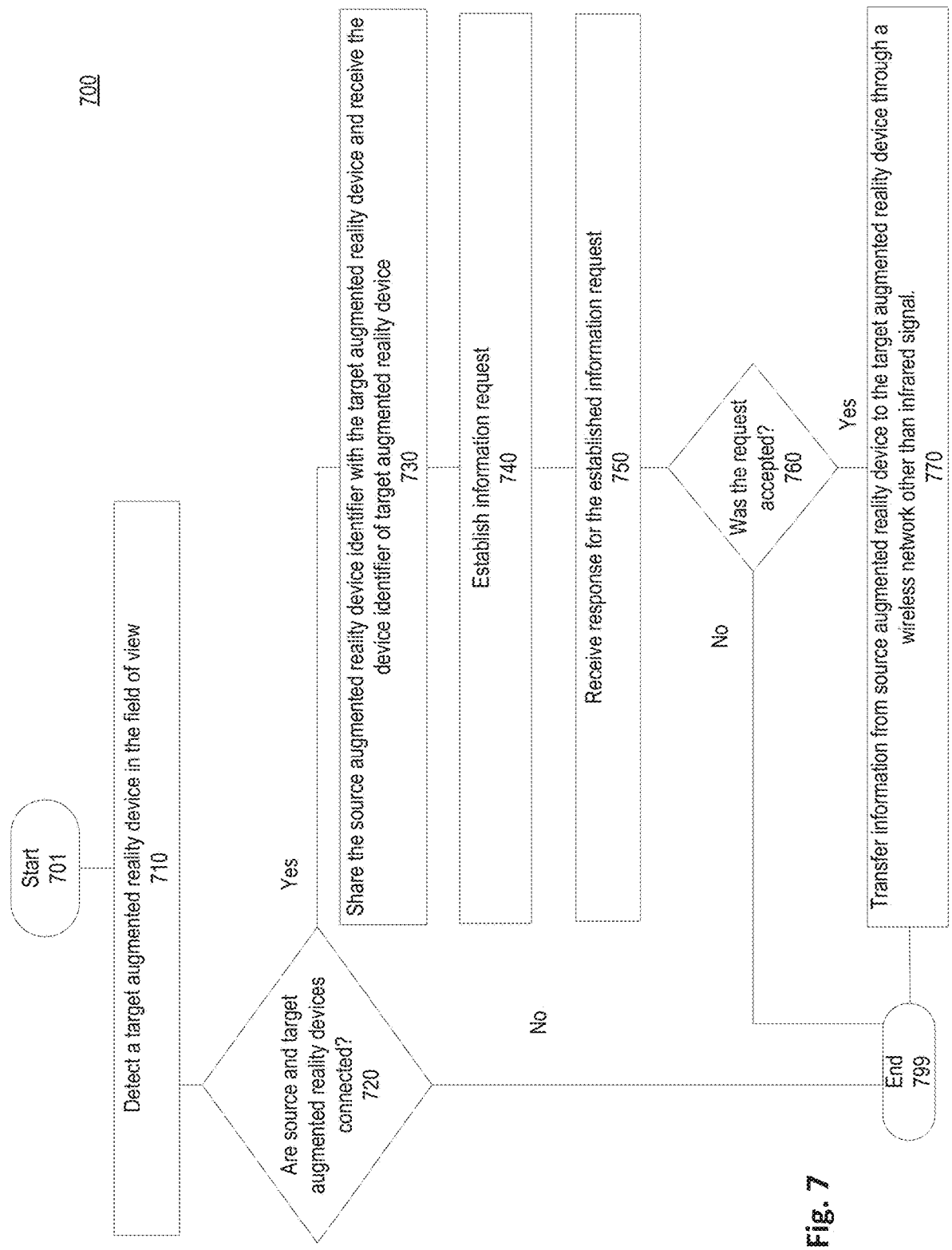

SYSTEMS AND METHODS FOR SHARING INFORMATION BETWEEN AUGMENTED REALITY DEVICES

TECHNICAL FIELD

This disclosure relates to sharing information between augmented reality systems. More specifically, this disclosure relates to systems and methods for seamless connection between two or more augmented reality devices without human intervention for sharing information.

BACKGROUND

The increasing availability of data and data sources in the modern world has driven innovation in the ways that people consume data. Individuals increasingly rely on online resources and the availability of data to inform their daily behavior and interactions. The ubiquity of portable, connected devices has allowed for the access of this type of information from almost anywhere.

The use of this information to augment one's view of the physical world, however, remains in its infancy. Current augmented reality systems can overlay visual data on a screen or viewport providing information overlaid onto the visual world. Although useful, these types of systems are usually limited to simply providing an additional display for information already available to a user or replicating the visual spectrum with overlaid data. There is a need for truly augmented systems that use contextual information and details about the visual perception of a user to provide a fully integrated, augmented reality experience.

Usually only the wearer of the augmented reality device can see the visual data overlaid atop their visual world. To have a fully integrated system there is a need for the augmented reality device to allow other users to view and/or interact with the same visual data, each through their own augmented reality device. Such a shared view and interaction with the visual data would need a quick and easy sharing setup to provide the fully integrated augmented reality experience.

Sharing information between devices and users is easier when the identity of the user receiving the information is known a priori. When a connection to share information is temporary and a device sharing information switches between several devices to share information, both knowing the identity of all possible devices or identifying and setting a sharing mechanism on the fly with various unknown devices are costly operations. While technologies like Bluetooth and WiFi and WiFi-direct simplify some of this connection and sharing setup steps, they still require constant selection of the device to pair when multiple devices previously paired or eligible to be paired are in a connection range. Such a selection step can be cumbersome and make it difficult to impossible when there are several devices with different names. This model of connecting devices becomes even more difficult when the names or other identifiers of devices to be selected for pairing are defined by the user of the augmented reality device, as these names can vary widely. There is a need for a seamless connection model where the user of the devices wanting to share information should only worry about which information to share and not how to setup the sharing mechanism.

SUMMARY

Certain embodiments of the present disclosure include a computer readable storage medium containing instructions that, when executed by at least one processor of a source augmented reality device, cause the source augmented reality device and a receiving augmented reality device share information. The instructions may perform operations to detect, using an infrared device of the source augmented reality device, a presence of a receiving augmented reality device; in response to the detection, establish a connection between the source augmented reality device and the receiving augmented reality device; and share, in response to the connection, information for displaying in a field of view of the source augmented reality device and a field of view of the receiving augmented reality device.

Certain embodiments relate to a computer-implemented method for sharing information between source augmented reality device and receiving augmented reality device. The method may include detecting, using an infrared device of the source augmented reality device, a presence of the receiving augmented reality device; in response to the detection, establishing a connection between the source augmented reality device and the receiving augmented reality device; and sharing, in response to the connection, information for displaying in a field of view of the source augmented reality device and a field of view of the receiving augmented reality device.

Certain embodiments of the present disclosure relate to a source augmented reality device configured to share information with a receiving augmented reality device. The source augmented reality device comprising an infrared device, a memory storing instructions, and at least one processor configured to: detect, using the infrared device of the source augmented reality device, a presence of the receiving augmented reality device; in response to the detection, establish a connection between the source augmented reality device and the receiving augmented reality device; and share, in response to the connection, information for displaying in at least one of a field of view of the source augmented reality device and a field of view of the receiving augmented reality device.

BRIEF DESCRIPTION OF THE DRAWINGS

Reference will now be made to the accompanying drawings showing example embodiments of this disclosure. In the drawings:

FIG. 2 is a block diagram of an exemplary computing device, consistent with embodiments of the present disclosure.

FIG. 7 is a flowchart of an exemplary method for information sharing in an augmented reality system, consistent with embodiments of the present disclosure.

DETAILED DESCRIPTION

Figure 1:
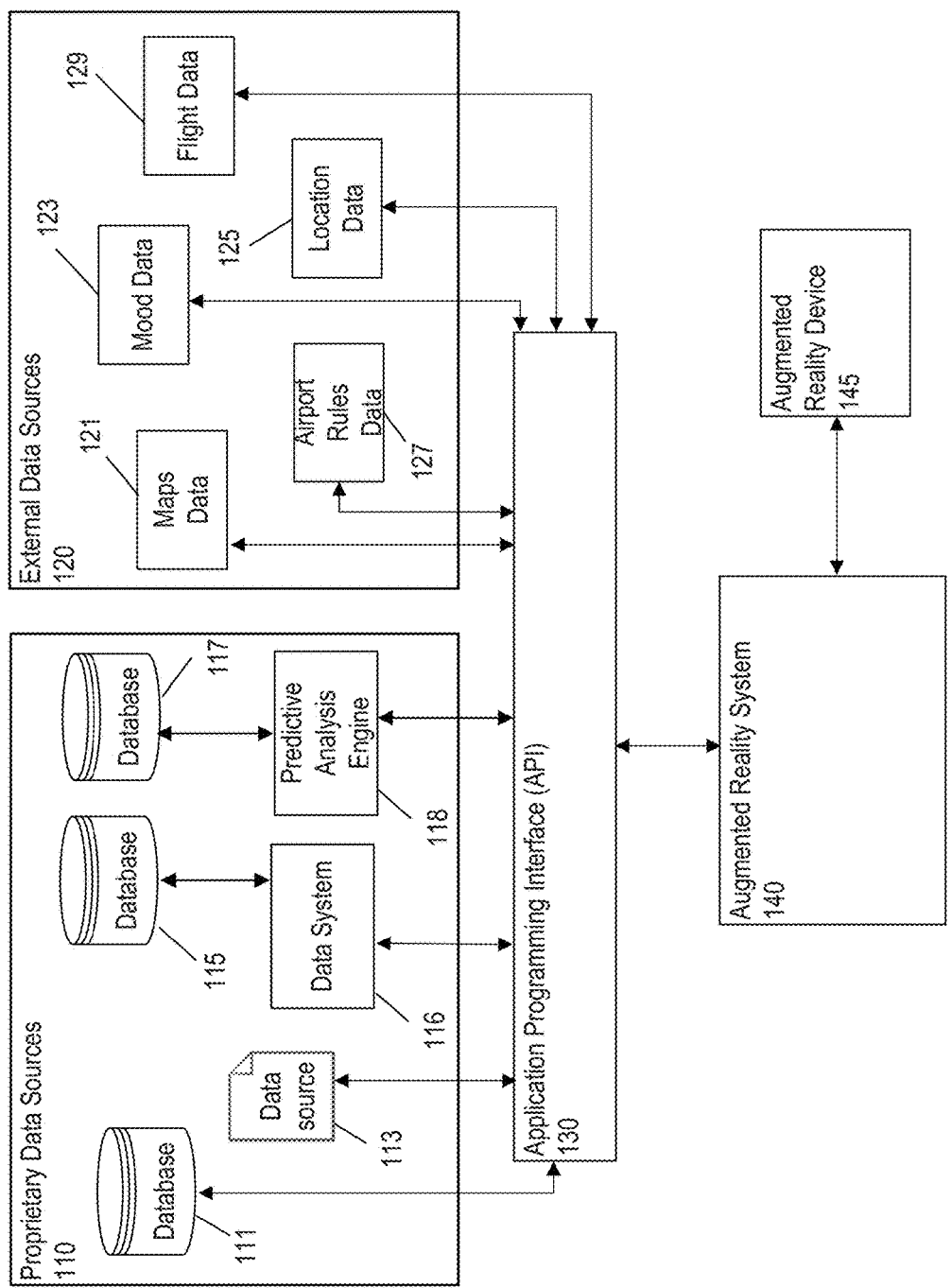
FIG. 1 is a block diagram of an exemplary system for an integrated augmented reality system, consistent with embodiments of the present disclosure.

Reference will now be made in detail to the exemplary embodiments implemented according to the present disclosure, examples of which are illustrated in the accompanying drawings. Wherever possible, the same reference numbers will be used throughout the drawings to refer to the same or like parts.

The embodiments described herein relate to improved interaction and integration in augmented reality systems. Augmented reality systems provide vast potential for enhancing visual understanding of the world at large. By complementing the visual perspective individuals experience with their eyes, augmented reality systems can provide a more detailed understanding of the world around us.

Current augmented reality systems can overlay computer-generated images and data on a visual field of view providing a visual experience not available with eyes alone. Current implementations, however, of augmented reality systems fail to provide a fully integrated experience. The visual overlay typically relates to things like notifications or alerts. In these systems, although the augmented reality experience provides a useful application, the augmentation is unrelated to the visual focus of the user. In other augmented reality systems, the graphical overlay provides information about objects the user is viewing, but the provided information is limited to that particular application and data set.

The embodiments described herein approach these problems from a different perspective. Instead of focusing on providing a limited set of information based on a particular application, the disclosed systems integrate data from the augmented reality device itself with a plethora of data sources associated with the individual. The disclosed systems can further analyze and process the available data using contextual information about the user. The result of this data integration can be provided to the user's augmented reality device to provide a comprehensive overlay of information about seemingly unrelated aspects of the user's visual field of view.

Moreover, the disclosed system and methods can tailor that information based on the contextual information about the individual. The provided overlay can link to other data sources managed by the individual or other parties to provide time, location, and context specific data related to items the individual is viewing.

For example, the system can recognize, based on location information from the augmented reality device or a user's mobile device that the user has arrived at an airport terminal. Using data from the user's digital calendar, along with data about the individual from a travel app hosted by an airline or other travel conveyor, along with other travel software, the disclosed systems and methods can further determine that the individual has an upcoming flight. Upon the individual's arrival, the disclosed system and method can use available information about the upcoming flight and the present check-in status of the individual to direct the individual to the appropriate check-in kiosk, customer service desk, ticketing counter, or boarding gate. Instead of simply providing augmented information about every ticketing counter, as is typical in current augmented reality systems, the disclosed system's integration of data from multiple data sources provides a tailored experience to the individual while also providing the present state of their reservation transaction with the airline or other travel conveyor.

Additionally, the disclosed system and methods can modernize current airport procedures. For example, in the previously described example, the described augmented reality systems can be used to detect where in the airport an individual is, the number of bags they may have, and where they may need to go. This information can be used by the travel systems to manage flight manifests, automatically check-in users, effectively indicate where checked baggage should be placed, automatically generate baggage tags, and provide boarding notifications. In this way, not only are the disclosed systems and methods helpful to the traveler, but they can also enhance the efficiency and effectiveness of airport operations by providing enhanced information that is used to make important decisions about flight and travel management.

Moreover, the disclosed system and methods can provide interactive experiences to the individual. The majority of current augmented reality systems simply disseminate information. Systems that do provide some level of interactivity do so based on a user's interaction with a particular application, limiting the usefulness. Because the disclosed system and methods provide integrated data tailored specifically to the individual, interaction from the individual can relate to any number activities or services associated with the individual. For example, as an individual waits at a gate to board an aircraft, information related to the individual's flight can not only be used to provide status updates, but can also be grated with the individual's general flight preferences, purchase preferences, or predictive purchasing analysis of the individual to provide detailed information about, among other things, additional seat availability, upgrade options, in-flight amenities, or pre-flight services. The individual can interact with the augmented reality system to change their seat or pre-select in-flight entertainment. Instead of requiring the individual to explicitly request this type of information, the integration provided by the disclosed system and methods allows the system and methods to preemptively provide relevant, useful information to the individual based on contextual information not available from the augmented reality device itself.

The embodiments described herein provide technologies and techniques for using vast amounts of available data (from a variety of data sources) to provide an integrated and interactive augmented reality experience. Embodiments described herein include systems and methods for obtaining contextual information about an individual and device information about an augmented reality device associated with the individual from the augmented reality device. The systems and methods further include obtaining a plurality of data sets associated with the individual or augmented reality device from a plurality of data sources and determining a subset of information from the plurality of data sets relevant to the individual wherein the relevancy of the information is based on the contextual information and the device information obtained from the augmented reality device. Moreover, the embodiments described include systems and methods for generating display data based on the determined subset of information; and providing the display data to the augmented reality device for display on the augmented reality device wherein the display data is overlaid on top of the individual's field of view In some embodiments, the technologies described further include systems and methods wherein the contextual information obtained from the augmented reality device includes visual data representative of the individual's field of view and wherein the relevancy of the subset of information is further based on an analysis of the visual data. Yet another of the disclosed embodiments includes systems and methods wherein the contextual information obtained from the augmented reality device includes at least one of location information, orientation information, and motion information. In other disclosed embodiments, systems and methods are provided wherein information obtained from the plurality of data sets (in this case the data is coming from proprietary data sources and from the device) includes travel information associated with the individual and wherein the travel information includes at least one of a user profile, travel preferences, purchased travel services, travel updates, and historical travel information.

Additional embodiments consistent with the present disclosure include systems and methods wherein the analysis of the contextual information and device information includes determining entities within the field of view of the individual and filtering information not associated with the entities.

FIG. 1 is a block diagram of an exemplary system 100 for an integrated augmented reality system, consistent with embodiments of the present disclosure. System 100 can include proprietary data sources 110 that include database 111, data source 113, database 115, database 117, data system 116, and predictive analysis engine 118. System 100 can further include external data sources 120 that can include maps data 121, mood data 123, airport rules data 127, flight data 129, and location data 125. System 100 can further include an application programming interface (API) 130. API 130 can be implemented on a server or computer system using, for example, a computing device 200, described in more detail below in reference to FIG. 2. For example, data from proprietary data sources 110 and external data sources 120 can be obtained through 110 devices 230 or a network interface 218 of computing device 200. Further, the data can be stored during processing in a suitable storage such as a storage 228 or system memory 221. Referring back to FIG. 1, system 100 can further include augmented reality system 140. Like API 130, augmented reality system 140 can be implemented on a server or computer system using, for example, computing device 200.

FIG. 2 is a block diagram of an exemplary computing device 200, consistent with embodiments of the present disclosure. In some embodiments, computing device 200 can be a specialized server providing the functionality described herein. In some embodiments, components of system 100, such as proprietary data sources 110 (e.g., database 111, data source 113, database 115, data system 116, database 117, and predictive analysis engine 118), API 130, augmented reality system 140, and augmented virtual reality device 145) can be implemented using computing device 200 or multiple computing devices 200 operating in parallel. Further, computing device 200 can be a second device providing the functionality described herein or receiving information from a server to provide at least some of the described functionality. Moreover, computing device 200 can be an additional device or devices that store or provide data consistent with embodiments of the present disclosure.

Computing device 200 can include one or more central processing units (CPUs) 220 and a system memory 221. Computing device 200 can also include one or more graphics processing units (GPUs) 225 and graphic memory 226. In some embodiments, computing device 200 can be a headless computing device that does not include GPU(s) 225 or graphic memory 226.

CPUs 220 can be single or multiple microprocessors, field-programmable gate arrays, or digital signal processors capable of executing sets of instructions stored in a memory (e.g., system memory 221), a cache (e.g., cache 241), or a register (e.g., one of registers 240). CPUs 220 can contain one or more registers (e.g., registers 240) for storing variable types of data including, inter alia, data, instructions, floating point values, conditional values, memory addresses for locations in memory (e.g., system memory 221 or graphic memory 226), pointers and counters. CPU registers 240 can include special purpose registers used to store data associated with executing instructions such as an instruction pointer, an instruction counter, or memory stack pointer. System memory 221 can include a tangible or a non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive or flash memory, processor cache, memory register, or a semiconductor memory. System memory 221 can be one or more memory chips capable of storing data and allowing direct access by CPUs 220, System memory 221 can be any type of random access memory (RAM), or other available memory chip capable of operating as described herein.

CPUs 220 can communicate with system memory 221 via a system interface 250, sometimes referred to as a bus. In embodiments that include GPUs 225, GPUs 225 can be any type of specialized circuitry that can manipulate and alter memory (e.g., graphic memory 226) to provide or accelerate the creation of images. GPUs 225 can store images in a frame buffer (e.g., a frame buffer 245) for output to a display device such as display device 224. In some embodiments, images stored in frame buffer 245 can be provided to other computing devices through network interface 218 or I/O devices 230. GPUs 225 can have a highly parallel structure optimized for processing large, parallel blocks of graphical data more efficiently than general purpose CPUs 220. Furthermore, the functionality of GPUs 225 can be included in a chipset of a special purpose processing unit or a co-processor.

CPUs 220 can execute programming instructions stored in system memory 221 or other memory, operate on data stored in memory (e.g., system memory 221) and communicate with GPUs 225 through the system interface 250, which bridges communication between the various components of computing device 200. In some embodiments, CPUs 220, GPUs 225, system interface 250, or any combination thereof, are integrated into a single chipset or processing unit GPUs 225 can execute sets of instructions stored in memory (e.g., system memory 221), to manipulate graphical data stored in system memory 221 or graphic memory 226. For example, CPUs 220 can provide instructions to CPUs 225, and GPUs 225 can process the instructions to render graphics data stored in the graphic memory 226. Graphic memory 226 can be any memory space accessible by GPUs 225, including local memory, system memory, on-chip memories, and hard disk. GPUs 225 can enable displaying of graphical data stored in graphic memory 226 on display device 224 or can process graphical information and provide that information to connected devices through network interface 218 or 110 devices 230.

Computing device 200 can include display device 224 and input/output (I/O) devices 230 (e.g., a keyboard, a mouse, or a pointing device) connected to I/O controller 223. I/O controller 223 can communicate with the other components of computing device 200 via system interface 250. It should now be appreciated that CPUs 220 can also communicate with system memory 221 and other devices in manners other than through system interface 250, such as through serial communication or direct point-to-point communication.

Similarly, GPUs 225 can communicate with graphic memory 226 and other devices in ways other than system interface 250. In addition to receiving input, CPUs 220 can provide output via I/O devices 230 (e.g., through a printer, speakers, bone conduction, or other output devices).

Furthermore, computing device 200 can include a network interface 218 to interface to a LAN, WAN, MAN, or the Internet through a variety of connections including, but not limited to, standard telephone lines, LAN or WAN links (e.g., 802.21, T1, T3, 56 kb, X.25), broadband connections (e.g., ISDN, Frame Relay, ATM), wireless connections (e.g., those conforming to, among others, the 802.11a., 802.11b, 802.11b/g/n, 802.11 ac, Bluetooth, Bluetooth LTE, 3GPP, or WiMax standards), or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Referring back to FIG. 1, system 100 can further include augmented reality device 145. Augmented reality device can be a device such as augmented reality device 390 depicted in FIG. 3B, described in more detail below, or some other augmented reality device. Moreover, augmented reality device 145 can be implemented using the components shown in device 300 shown in FIG. 3A, described in more detail below.

Figure 3A:
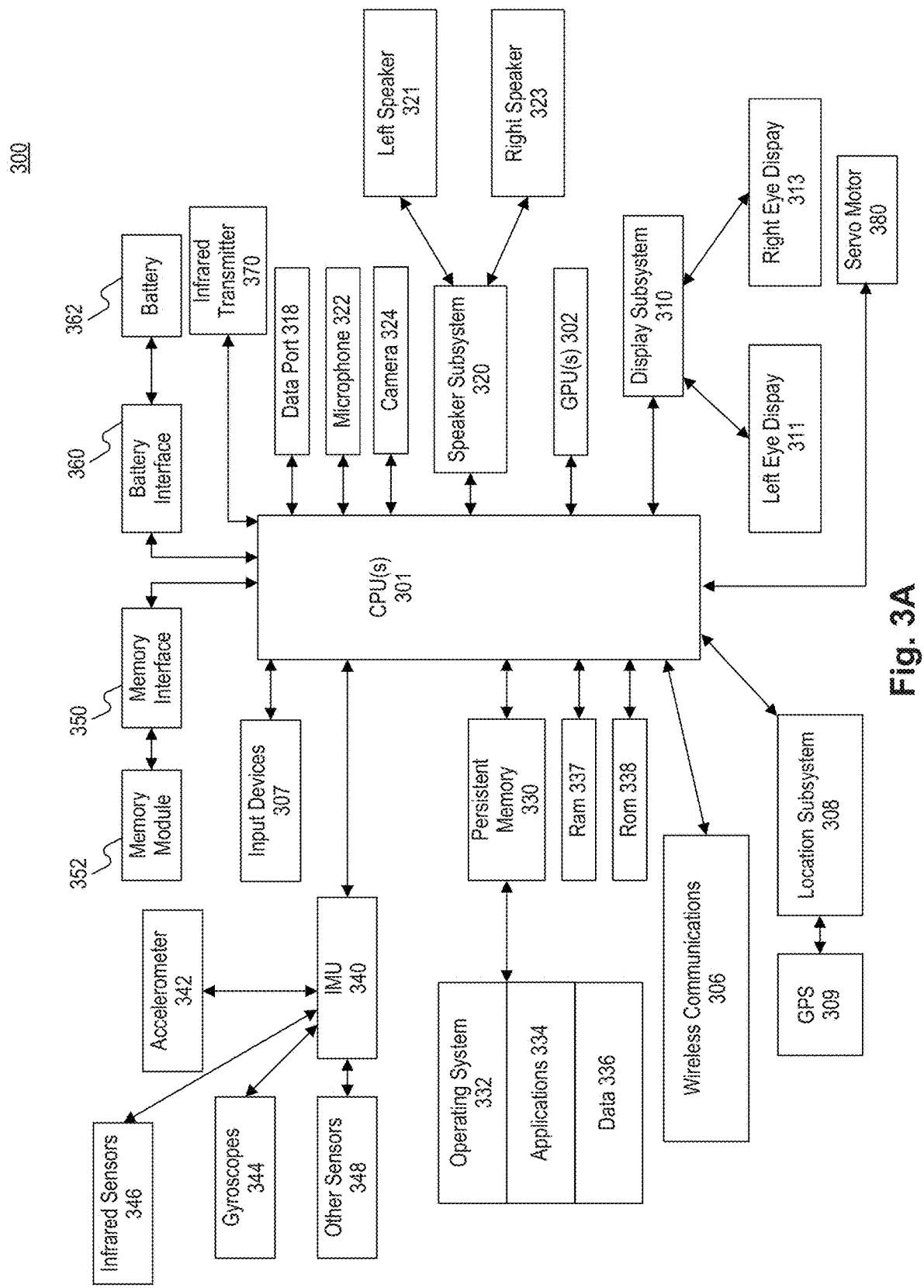
FIGS. 3A and 3B are diagrams of exemplary augmented reality devices, consistent with embodiments of the present disclosure.
Figure 3B:
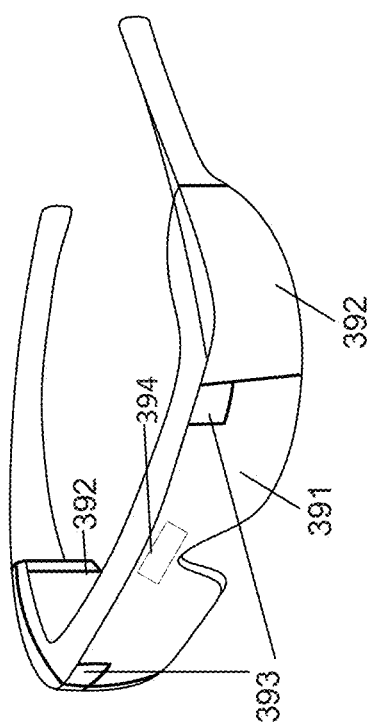

FIGS. 3A and 3B are diagrams of exemplary augmented reality devices including electronic device 300 and augmented reality device 390, consistent with embodiments of the present disclosure. These exemplary augmented reality devices can represent the internal components (e.g., as shown in FIG. 3A) of an augmented reality device and the external components (e.g., as show in FIG. 3B) of an augmented reality device. In some embodiments, FIG. 3A can represent exemplary electronic device 300 contained within augmented reality device 390 of FIG. 3B.

FIG. 3A is a simplified block diagram illustrating exemplary electronic device 300. In some embodiments, electronic device 300 can include an augmented reality device having video display capabilities and the capability to communicate with other computer systems, for example, via the Internet. Depending on the functionality provided by electronic device 300, in various embodiments, electronic device 300 can be or can include a handheld device, a multiple-mode communication device configured for both data and voice communication, a smartphone, a mobile telephone, a laptop, a computer wired to the network, a netbook, a gaming console, a tablet, a smart watch, eye glasses, a headset, goggles, or a PDA enabled for networked communication.

Electronic device 300 can include a case (not shown) housing component of electronic device 300. The internal components of electronic device 300 can, for example, be constructed on a printed circuit board (PCB). Although the components and subsystems of electronic device 300 can be realized as discrete elements, the functions of the components and subsystems can also be realized by integrating, combining, or packaging one or more elements together in one or more combinations.

Electronic device 300 can include a controller comprising one or more CPU(s) 301, which controls the overall operation of electronic device 300. CPU(s) 301 can be one or more microprocessors, field programmable gate arrays (FPGAs), digital signal processors (DSPs), or any combination thereof capable of executing particular sets of instructions. CPU(s) 301 can interact with device subsystems such as a wireless communication system 306 (which can employ any appropriate wireless (e.g., RF), optical, or other short range communications technology (for example, WiFi, Bluetooth or NFC)) for exchanging radio frequency signals with a wireless network or other augmented reality devices to perform communication functions, an audio subsystem 320 for producing audio, location subsystem 308 for acquiring location information, and a display subsystem 310 for producing display elements. Audio subsystem 320 can transmit audio signals for playback to left speaker 321 and right speaker 323. The audio signal can be either an analog or a digital signal.

CPU(s) 301 can also interact with input devices 307, a persistent memory 330, a random access memory (RAM) 337, a read only memory (ROM) 338, a data port 318 (e.g., a conventional serial data port, a Universal Serial Bus (USB) data port, a 30-pin data port, a Lightning data port, or a High-Definition Multimedia Interface (HDMI) data port), a microphone 322, camera 324, and wireless communication system 306. Some of the subsystems shown in FIG. 3 perform communication-related functions, whereas other subsystems can provide "resident" or on-device functions.

Wireless communication system 306 includes communication systems for communicating with a network to enable communication with any external devices (e.g., a server, not shown). The particular design of wireless communication system 306 depends on the wireless network in which electronic device 300 is intended to operate. Electronic device 300 can send and receive communication signals over the wireless network after the required network registration or activation procedures have been completed. In some embodiments wireless communication system 306 is used to communicate with other augmented reality devices also connected to the same network for communicating with other external devices.

Location subsystem 308 can provide various systems such as a global positioning system (e.g., a GPS 309) that provides location information. Additionally, location subsystem can utilize location information from connected devices (e.g., connected through wireless communication system 306) to further provide location data. The location information provided by location subsystem 308 can be stored in, for example, persistent memory 330, and used by applications 334 and an operating system 332.

Display subsystem 310 can control various displays (e.g., a left eye display 311 and a right eye display 313). In order to provide an augmented reality display, display subsystem 310 can provide for the display of graphical elements (e.g., those generated using GPU(s) 302) on transparent displays. In other embodiments, the display generated on left eye display 311 and right eye display 313 can include an image captured by camera 324 and reproduced with overlaid graphical elements. Moreover, display subsystem 310 can display different overlays on left eye display 311 and right eye display 313 to show different elements or to provide a simulation of depth or perspective.

Camera 324 can be a CMOS camera, a CCD camera, or any other type of camera capable of capturing and outputting compressed or uncompressed image data such as still images or video image data. In some embodiments, electronic device 300 can include more than one camera, allowing the user to switch, from one camera to another, or to overlay image data captured by one camera on top of image data captured by another camera. Image data output from camera 324 can be stored in, for example, an image buffer, which can be a temporary buffer residing in RAM 337, or a permanent buffer residing in ROM 338 or persistent memory 330. The image buffer can be, for example, a first-in first-out (FIFO) buffer. In some embodiments the image buffer can be provided directly to GPU(s) 302 and display subsystem 310 for display on left eye display 311 or right eye display 313 with or without a graphical overlay.

Electronic device 300 can include an inertial measurement unit (e.g., IMU 340) for measuring motion and orientation data associated with electronic device 300. IMU 340 can utilize an accelerometer 342, gyroscopes 344, infrared sensors 346, and other sensors 348 to capture specific force, angular rate, magnetic fields, and biometric information for use by electronic device 300. The data capture by IMU 340 and the associated sensors (e.g., accelerometer 342, gyroscopes 344, infrared Sensors 346, and other sensors 348) can be stored in memory such as persistent memory 330 or RAM 337 and used by applications 334 and operating system 332. The data gathered through IMU 340 and its associated sensors can also be provided to networked devices through, for example, wireless communication system 306.

CPU(s) 301 can be one or more processors that operate under stored program control and executes software modules stored in a tangibly-embodied non-transitory computer-readable storage medium such as persistent memory 330, which can be a register, a processor cache, a Random Access Memory (RAM), a flexible disk, a hard disk, a CD-ROM (compact disk-read only memory), and MO (magneto-optical), a DVD-ROM (digital versatile disk-read only memory), a DVD RAM (digital versatile disk-random access memory), or other semiconductor memories.

Software modules can also be stored in a computer-readable storage medium such as ROM 338, or any appropriate persistent memory technology, including EEPROM, EAROM, FLASH. These computer-readable storage mediums store computer-readable instructions for execution by CPU(s) 301 to perform a variety of functions on electronic device 300. Alternatively, functions and methods can also be implemented in hardware components or combinations of hardware and software such as, for example, ASICs or special purpose computers.

The software modules can include operating system software 332, used to control operation of electronic device 300. Additionally, the software modules can include software applications 334 for providing additional functionality to electronic device 300. For example, software applications 334 can include applications designed to interface with systems like system 100 above. Applications 334 can provide specific functionality to allow electronic device 300 to interface with different data systems and to provide enhanced functionality and visual augmentation.

Software applications 334 can also include a range of applications, including, for example, an e-mail messaging application, an address book, a notepad application, an Internet browser application, a voice communication (i.e., telephony or Voice over Internet Protocol (VoIP)) application, a mapping application, a media player application, a health-related application, etc. Each of software applications 334 can include layout information defining the placement of particular fields and graphic elements intended for display on the augmented reality display (e.g., through display subsystem 310) according to that corresponding application. In some embodiments, software applications 334 are software modules executing under the direction of operating system 332. In some embodiments, the software applications 334 can also include audible sounds and instructions to be played through the augmented reality device speaker system (e.g., through left 321 and right speakers 323 of speaker subsystem 320).

Operating system 332 can provide a number of application protocol interfaces (APIs) providing an interface for communicating between the various subsystems and services of electronic device 300, and software applications 334. For example, operating system software 332 provides a graphics API to applications that need to create graphical elements for display on electronic device 300. Accessing the user interface API can provide the application with the functionality to create and manage augmented interface controls, such as overlays; receive input via camera 324, microphone 322, or input device 307; and other functionality intended for display through display subsystem 310. Furthermore, a camera service API can allow for the capture of video through camera 324 for purposes of capturing image data such as an image or video data that can be processed and used for providing augmentation through display subsystem 310. Additionally, a sound API can deliver verbal instructions for the user to follow, sound effects seeking the user's attention, success or failure in processing certain input, music for entertainment, or to indicate wait time to process a request submitted by the user of the device. The sound API allows for configuration of the system to deliver different music, sounds and instructions based on the user and other contextual information. The audio feedback generated by calling sound API is transmitted In some embodiments, the components of electronic device 300 can be used together to provide input from the user to electronic device 300. For example, display subsystem 310 can include interactive controls on left eye display 311 and right eye display 313. As part of the augmented display, these controls can appear in front of the user of electronic device 300. Using camera 324, electronic device 300 can detect when a user selects one of the controls displayed on the augmented reality device. The user can select a control by making a particular gesture or movement captured by the camera, touching the area of space where display subsystem 310 displays the virtual control on the augmented view, or by physically touching input device 307 on electronic device 300. This input can be processed by electronic device 300. In some embodiments, a user can select a virtual control by gazing at said control, with eye movement captured by eye tracking sensors (e.g., other sensors 348) of the augmented reality device. A user gazing at a control may be considered to have made a selection if the eyes do not move or have very little movement (e.g. less than a predefined distance) for a defined period of time. In some embodiments, a user can move their head, thereby moving the augmented reality device that is tracked by gyroscope sensor 344, to place a virtual dot in order to select a control, The selection can be achieved by placing the dot on a certain control for a predefined period of time or by using a handheld input device (e.g., input devices 307) connected to the augmented reality device 300, or by performing a hand gesture.

Camera 324 can further include multiple cameras to detect both direct user input as wall as be used for head tracking and hand tracking. As a user moves their head and hands, camera 324 can provide visual information corresponding to the moving environment and movements of the user's hands. These movements can be provided to CPU(s) 301, operating system 332, and applications 334 where the data can be combined with other sensor data and information related to the augmented information displayed through display subsystem 310 to determine user selections and input.

Moreover, electronic device 300 can receive direct input from microphone 322. In some embodiments, microphone 322 can be one or more microphones used for the same or different purposes. For example, in multi-microphone environments some microphones can detect environmental changes while other microphones can receive direct audio commands from the user. Microphone 322 can directly record audio of a surrounding environment or audio-command input from the user. Similar to the visual data from camera 324, audio data from microphone 322 can be provided to CPU(s) 301, operating system 332, and applications 334 for processing to determine the user's input.

In some embodiments, persistent memory 330 stores data 336, including data specific to a user of electronic device 300, such as information of user accounts or device specific identifiers. Persistent memory 330 can also store data (e.g., contents, notifications, and messages) obtained from services accessed by electronic device 300. Persistent memory 330 can further store data relating to various applications with preferences of the particular user of, for example, electronic device 300. In some embodiments, persistent memory 330 can store data 336 linking a user's data with a particular field of data in an application, such as for automatically providing a user's credentials to an application executing on electronic device 300. Furthermore, in various embodiments, data 336 can also include service data comprising information required by electronic device 300 to establish and maintain communication with a network.

In some embodiments, electronic device 300 can also include one or more removable memory modules 352 (e.g., FLASH memory) and a memory interface 350. Removable memory module 352 can store information used to identify or authenticate a user or the user's account to a wireless network. For example, in conjunction with certain types of wireless networks, including GSM and successor networks, removable memory module 352 is referred to as a Subscriber Identity Module (SIM). Memory module 352 can be inserted in or coupled to memory module interface 350 of electronic device 300 in order operate in conjunction with the wireless network.

Electronic device 300 can also include a battery 362, which furnishes energy for operating electronic device 300. Battery 362 can be coupled to the electrical circuitry of electronic device 300 through a battery interface 360, which can manage such functions as charging battery 362 from an external power source (not shown) and the distribution of energy to various loads within or coupled to electronic device 300.

A set of applications that control basic device operations, including data and possibly voice communication applications, can be installed on electronic device 300 during or after manufacture. Additional applications or upgrades to operating system software 332 or software applications 334 can also be loaded onto electronic device 300 through data port 318, wireless communication system 306, memory module 352, or other suitable system. The downloaded programs or code modules can be permanently installed, for example, written into the persistent memory 330, or written into and executed from RAM 337 for execution by CPU(s) 301 at runtime.

FIG. 3B is an exemplary augmented reality device 390. In some embodiments, augmented reality device 390 can be contact lenses, glasses, goggles, or headgear that provides an augmented viewport for the wearer. In other embodiments (not shown in FIG. 3B) the augmented reality device can be part of a computer, mobile device, portable telecommunications device, tablet, PDA, or other computing device as described in relation to FIG. 3A. Augmented reality device 390 corresponds to augmented reality device 145 shown in FIG. 1.

As shown in FIG. 3B, augmented reality device 390 can include a viewport 391 that the wearer can look through. Augmented reality device 390 can also include processing components 392. Processing components 392 can be enclosures that house the processing hardware and components described above in relation to FIG. 3A. Although shown as two distinct elements on each side of augmented reality device 390, the processing hardware or components can be housed in only one side of augmented reality device 390. The components shown in FIG. 3A can be included in any part of augmented reality device 390.

In some embodiments, augmented reality device 390 can include display devices 393. These display devices can be associated with left eye display 311 and right eye display 313 of FIG. 3A. In these embodiments, display devices 393 can receive the appropriate display information from left eye display 311, right eye display 313, and display subsystem 310, and project or display the appropriate overlay onto viewport 391. Through this process, augmented display device 390 can provide augmented graphical elements to be shown in the wearer's field of view.

Referring back to FIG. 1, each of databases 111, 115, and 117, data source 113, data system 116, predictive analysis engine 118, API 130, and augmented reality system 140 can be a module, which is a packaged functional hardware unit designed for use with other components or a part of a program that performs a particular function of related functions. Each of these modules can be implemented using computing device 200 of FIG. 2. Each of these components is described in more detail below. In some embodiments, the functionality of system 100 can be split across multiple computing devices (e.g., multiple devices similar to computing device 200) to allow for distributed processing of the data. In these embodiments the different components can communicate over I/O device 230 or network interface 218 of computing device 200.

Data can be made available to system 100 through proprietary data sources 110 and external data sources 120. It will now be appreciated that the exemplary data sources shown for each (e.g., databases 111, 115, and 117, data source 113, data system 116, and predictive analysis engine 118 of proprietary data sources 110 and maps data 121, mood data 123, airport rules data 127, flight data 129, and location data 125 of external data sources 120) are not exhaustive. Many different data sources and types of data can exist in both proprietary data sources 110 and external data sources 120. Moreover, some of the data can overlap among external data sources 120 and proprietary data sources 110. For example, external data sources 120 can provide location data 125, which can include data about specific airports or businesses. This same data can also be included, in the same or a different form, in, for example, database 111 of proprietary data sources 110.

Moreover, any of the data sources in proprietary data sources 110 and external data sources 120, or any other data sources used by system 100, can be a Relational Database Management System (RDBMS) (e.g., Oracle Database, Microsoft SQL Server, MySQL, PostgreSQL, or IBM DB2). An RDBMS can be designed to efficiently return data for an entire row, or record, in as few operations as possible. An RDBMS can store data by serializing each row of data. For example, in an RDBMS, data associated with a record can be stored serially such that data associated with all categories of the record can be accessed in one operation. Moreover, an RDBMS can efficiently allow access of related records stored in disparate tables by joining the records on common fields or attributes.

In some embodiments, any of the data sources in proprietary data sources 110 and external data sources 120, or any other data sources used by system 100, can be a non-relational database management system (NRDBMS) (e.g., XML, Cassandra, CouchDB, MongoDB, Oracle NoSQL Database, FoundationDB, or Redis). A non-relational database management system can store data using a variety of data structures such as, among others, a key-value store, a document store, a graph, and a tuple store. For example, a non-relational database using a document store could combine all of the data associated with a particular record into a single document encoded using XML. A non-relational database can provide efficient access of an entire record and provide for effective distribution across multiple data systems.

In some embodiments, any of the data sources in proprietary data sources 110 and external data sources 120, or any other data sources used by system 100, can be a graph database (e.g., Neo4j or Titan). A graph database can store data using graph concepts such as nodes, edges, and properties to represent data. Records stored in a graph database can be associated with other records based on edges that connect the various nodes. These types of databases can efficiently store complex hierarchical relationships that are difficult to model in other types of database systems.

In some embodiments, any of the data sources in proprietary data sources 110 and external data sources 120, or any other data sources used by system 100, can be accessed through an API. For example, data system 116 could be an API that allows access to the data in database 115. Moreover, external data sources 120 can all be publicly available data accessed through an API. API 130 can access any of the data sources through their specific API to provide additional data and information to system 100.

Although the data sources of proprietary data sources 110 and external data sources 120 are represented in FIG. 1 as isolated databases or data sources, it is appreciated that these data sources, which can utilize, among others, any of the previously described data storage systems, can be distributed across multiple electronic devices, data storage systems, or other electronic systems. Moreover, although the data sources of proprietary data sources 110 are shown as distinct systems or components accessible through API 130, it is appreciated that in some embodiments these various data sources can access one another directly through interfaces other than API 130.

In addition to providing access directly to data storage systems such as database 111 or data source 113, proprietary data sources 110 can include data system 116. Data system 116 can connect to one or multiple data sources, such as database 115. Data system 116 can provide an interface to the data stored in database 115. In some embodiments, data system can combine the data in database 115 with other data or data system 116 can preprocess the data in database 115 before providing that data to API 130 or some other requester.

Proprietary data sources 110 can further include predictive analysis engine 118. Predictive analysis engine 118 can use data stored in database 117 and can store new data in database 117. Predictive analysis engine can both provide data to other systems through API 130 and receive data from other systems or components through API 130. For example, predictive analysis engine 118 can receive, among other things, information on purchases made by users, updates to travel preferences, browsed services, and declined services. The information gathered by predictive analysis engine 118 can include anything data related to both information stored in the other components of proprietary data sources 110 as well as information from external data sources 120.

Using this data, predictive analysis engine 118 can utilize various predictive analysis and machine learning technologies including, among others, supervised learning, unsupervised learning, semi-supervised learning, reinforcement learning, and deep learning. These techniques can be used to build and update models based on the data gathered by predictive analysis engine 118. By applying these techniques and models to new data sets, predictive analysis engine 118 can provide information based on past behavior or chooses made by a particular individual. For example, predictive analysis engine can receive data from augmented reality device 145 and augmented reality system 140 regarding a particular individual. Predictive analysis engine 118 can use profile information and past purchase information associated with that individual to determine travel services, such as seat upgrades or in-flight amenities, that the individual might enjoy. For example, predictive analysis engine 118 can determine that the individual has never chosen to upgrade to first class but often purchases amenities such as premium drinks and in-flight entertainment packages. Accordingly, predictive analysis engine can determine that the individual can be presented with an option to purchase these amenities and not an option to upgrade their seat. It will now be appreciated that predictive analysis engine 118 is capable of using advanced techniques that go beyond this provided example. Proprietary data sources 110 can represent various data sources (e.g., database 111, data source 113, database 115, data system 116, database 117, and predictive analysis engine 118) that are not directly accessible or available to the public. These data sources can be provided to subscribers based on the payment of a fee or a subscription. Access to these data sources can be provided directly by the owner of the proprietary data sources or through an interface such as API 130, described in more detail below.

Although only one grouping of proprietary data sources 110 is shown in FIG. 1, a variety of proprietary data sources can be available to system 100 from a variety of providers. In some embodiments, each of the groupings of data sources will include data related to a common industry or domain. In other embodiments, the grouping of proprietary data sources can depend on the provider of the various data sources.

For example, the data sources in proprietary data sources 110 can contain data related to the airline travel industry. In this example, database 111 can contain travel profile information. In addition to basic demographic information, the travel profile data can include upcoming travel information, past travel history, traveler preferences, loyalty information, and other information related to a traveler profile. Further in this example, data source 113 can contain information related to partnerships or ancillary services such as hotels, rental cars, events, insurance, and parking. Additionally, database 115 can contain detailed information about airports, airplanes, specific seat arrangements, gate information, and other logistical information. As previously described, this information can be processed through data system 116. Accordingly, in this exemplary embodiment, the data sources in proprietary data sources 110 can provide comprehensive travel data.

Similar to proprietary data sources 110, external data sources 120 can represent various data sources (e.g., maps data 121, mood data 123, airport rules data 127, flight data 129, and location data 125). Unlike proprietary data sources 110, external data sources 120 can be accessible to the public or can be data sources that are outside of the direct control of the provider of API 130 or system 100.

Although only one grouping of external data sources 120 is shown in FIG. 1, a variety of external data sources can be available to system 100 from a variety of providers. In some embodiments, each of the groupings of data sources will include data related to a common industry or domain. In other embodiments, the grouping of external data sources can depend on the provider of the various data sources. In some embodiments, the external data sources 120 can represent every external data source available to API 130.

Moreover, the specific types of data shown in external data sources 120 are merely exemplary. Additional types of data can be included and the inclusion of specific types of data in external data sources 120 is not intended to be limiting.

As shown in FIG. 1, external data sources 120 can include maps data 121. Maps data can include location, maps, and navigation information available through a provided API such as, among others, Google Maps API or the Open Street Map API. Mood data 123 can include different possible moods of a customer and possible interactions to counter the bad mood or continue to keep the customer in a happier mood, etc. For example, mood data 123 can include data from, among others, historical feedback provided by customers and customer facial analysis data. Location data 125 can include specific data such as business profiles, operating hours, menus, or similar. Airport rules data 127 can be location specific rules, for example baggage allowances in terms of weight and count. Flight data 129 can include flight information, gate information, or airport information that can be accessed through among others, the FlightStats API, FlightWise API, FlightStats API and the FlightAware API. Each of these external data sources 120 (e.g., maps data 121, mood data 123, weather data 127, flight data 129, and location data 125) can provide additional data accessed through API 130. In some embodiments, the flight data may be part of proprietary data sources 110.

As previously described, API 130 can provide a unified interface for accessing any of the data available through proprietary data sources 110 and external data sources 120 in a common interface. API 130 can be software executing on, for example, a computing device such as computing device 200 described in relation to FIG. 2. In these embodiments, API 130 can be written using any standard programming language (e.g., Python, Ruby, Java, C, C++, node.js, PHP, Perl, or similar) and can provide access using a variety of data transfer formats or protocols including, among others, SOAP, JON objects, REST based services, XML, or similar. API 130 can provide receive request for data in a standard format and respond in a predictable format.

API 130 can combine data from one or more data sources (e.g., data stored in proprietary data sources 110, external data sources 120, or both) into a unified response. Additionally, in some embodiments API 130 can process information from the various data sources to provide additional fields or attributes not available in the raw data. This processing can be based on one or multiple data sources and can utilize one or multiple records from each data source. For example, API 130 could provide aggregated or statistical information such as averages, sums, numerical ranges, or other calculable information. Moreover, API 130 can normalize data coming from multiple data sources into a common format. The previous description of the capabilities of API 130 is only exemplary, There are many additional ways in which API 130 can retrieve and package the data provided through proprietary data sources 110 and external data sources 120.

Augmented reality system 140 can interact with augmented reality device 145 and API 130. Augmented reality system 140 can receive information related to augmented reality device 145 (e.g., through wireless communication system 306 of FIG. 3). This information can include any of the information previously described in relation to FIG. 3. For example, augmented reality system 140 can receive location information, motion information, visual information, sound information, orientation information, biometric information, or any other type of information provided by augmented reality device 145. Additionally, augmented reality system 140 can receive identifying information from augmented reality device 145 such as a device specific identifier or authentication credentials associated with the user of augmented reality device 145.

Augmented reality system 140 can process the information received and formulate requests to API 130. These requests can utilize identifying information from augmented reality device 145, such as a device identifier or authentication credentials from the user of augmented. reality device 145.

In addition to receiving information from augmented reality device 145, augmented reality system 140 can push updated information to augmented reality device 145. For example, augmented reality system 140 can push updated flight information to augmented reality device 145 as it is available. In this way, augmented reality system 140 can both pull and push information from and to augmented reality device 145. Moreover, augmented reality system 140 can pull (e.g., via API 130) information from external data sources 120. For example, if a passenger at the airport requests to be checked-in, augmented reality system 140 can acquire travel reservation information and guide the agent to help check-in the passenger by providing the itinerary information on augmented reality device 145 via a customized user interface (e.g., interaction in FIGS. 5A-5B).

Using the information from augmented reality device 145, augmented reality system 140 can request detailed information through API 130. The information returned from API 130 can be combined with the information received from augmented reality device 145 and processed by augmented reality system 140. Augmented reality system 140 can then make intelligent decisions about updated augmented reality information that should be displayed by augmented reality device 145. Exemplary use cases of this processing are described in more detail below in relation to FIGS. 5A, 5B, 6A-6C, 7 and 8. Augmented reality device 145 can receive the updated augmented reality information and display the appropriate updates on, for example, viewport 391 shown in FIG. 3B, using display devices 393.

Figure 4:
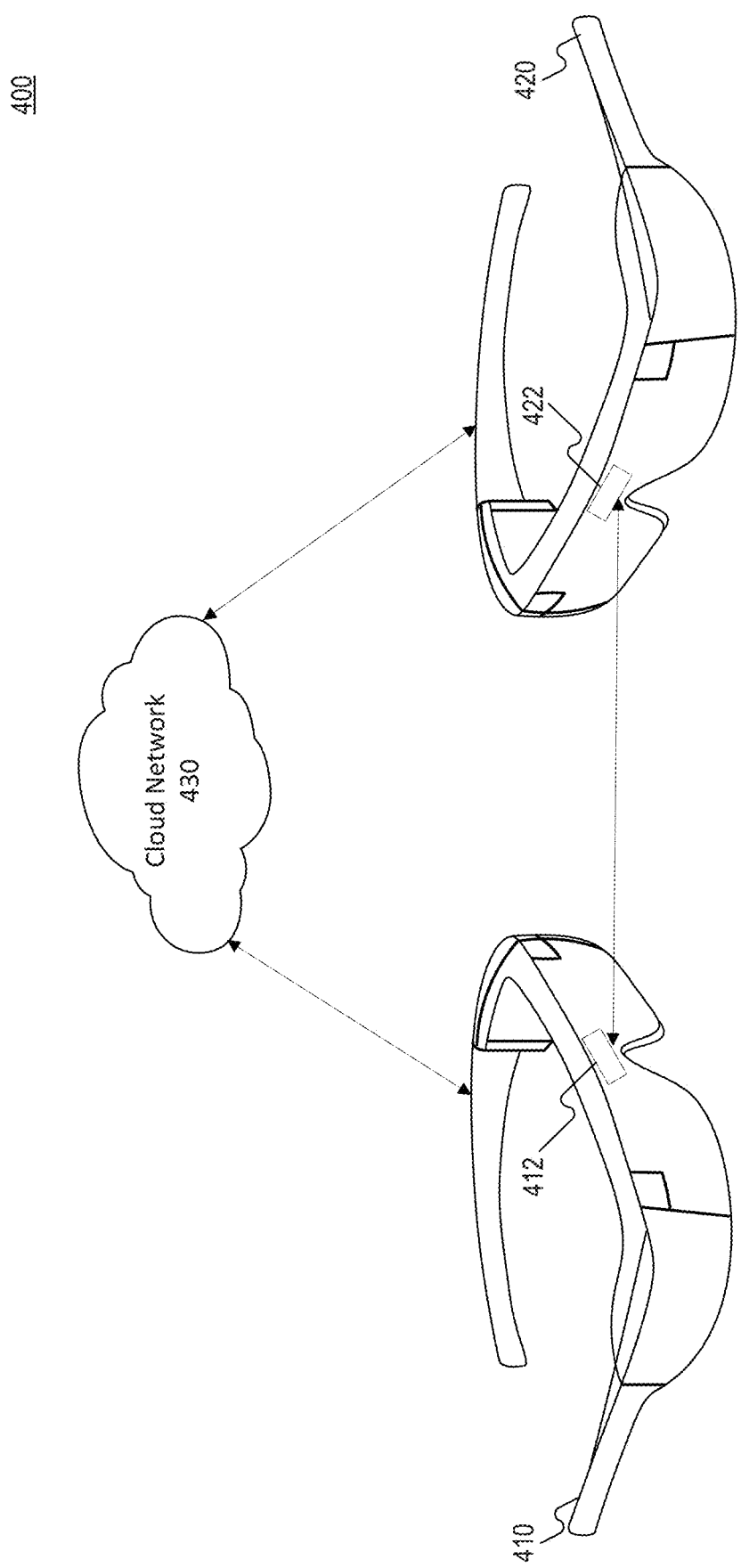
FIG. 4 is an exemplary system 400 of connected augmented reality devices, consistent with embodiments of the present disclosure.

FIG. 4 is an exemplary system 400 of connected augmented reality devices, consistent with embodiments of the present disclosure. System 400 can include multiple augmented reality devices 410 and 420. System 400 can further include network 430 (e.g., such as a cloud network) having one or more computers present in the same premises of the augmented realty devices 410 and 420 or in a remote location. Augmented reality device 410 and 420 may be similar in configuration to device 300 of FIG. 3A.

Augmented reality device 410 and 420 can include infrared transceivers 412 and 422, respectively. Both infrared transceivers 412 and 422 can contain a sensor (e.g., infrared sensors 346 of FIG. 3A) to recognize the receipt of an infrared signal and an infrared signal transmitter (infrared transmitter 370 of FIG. 3A).

Augmented reality devices may communicate with each other using infrared transceiver 412 and 422. Communication between augmented reality devices may include being present in a field of view of an augmented reality device. Communication between augmented reality devices may further include sharing a unique identifier of the augmented reality device. For example, augmented reality device 410 and 420 may communicate with each other by sharing a unique identifier such as a MAC address (media access control address), a device manufacturing identifier, or a network address that uniquely identifies the augmented reality device (which can include a component associated with the device). Augmented reality devices 410 and 420 may share more than one of these unique identifiers to initiate communications between themselves. Communications may also include sharing information between augmented reality devices 410 and 420. Augmented reality devices 410 and 420 may require to be connected prior to sharing information. Augmented reality devices 410 and 420 can be connected by sharing their unique identifiers to each other to indicate their presence in each other's field of view. In some embodiments only one of the two augmented reality devices connected need to share their identifier. Augmented reality devices 410 and 420 may only share information with devices they are currently connected with. Augmented reality devices 410 and 420 need not necessarily be in a field of view of each other after the initial connection to share information between each other.

Information sharing may be restricted to the augmented reality device initiating or receiving the communicatively coupling request. For example, a passenger at a flight gate in an airport facility and wearing augmented reality device 410 may initiate a coupling request to share the passenger flight ticket with augmented reality device 420 worn by a gate agent. The gate agent wearing augmented reality device that receives the coupling request can accept the request and receive the ticket for verification purposes. The gate agent may not be sharing any information and thus would not be initiating coupling requests.

In some embodiments, the augmented reality devices may be allowed to share information if they have been connected in the past. Augmented reality devices 410 and 422 may include a favorite list of augmented reality devices and immediately allow sharing of information without initiating a request to be connected. In some embodiments, augmented reality device 410 and 420 may contain a similar favorite list of augmented reality devices with which the information can be shared without a request to be connected.

Augmented reality devices 410 and 420 may be connected to a cloud network 430 to access and store information. Cloud network 430 may include database 111 and other proprietary data sources 110 of FIG. 1. Augmented reality device 410 may share information stored in proprietary data sources 110 for a temporary period of time. For example, a check-in agent in an airport facility wearing the augmented reality device 410 may share access to the seat map to a passenger wearing augmented reality device 420 in order for the passenger to select a seat. In some other embodiments, augmented reality device 410 may share information by making a copy of the information and transmitting over the cloud network 430 to augmented reality device 420. Cloud network 430 may route the information shared by augmented reality device 410 to augmented reality device 420. In some embodiments, augmented reality device 410 is connected to augmented reality device 420 in an ad-hoc manner. The ad-hoc connect can be a direct peer to peer connection (e.g., WiFi Direct, Bluetooth) or through other augmented reality devices forming a mesh network. In some embodiments, the augmented reality devices 410 and 420 need authorization to access the transmitted information. The authorization may be granted by being on the same network or connected to the same cloud network. In some embodiments, augmented reality devices connected directly may not need authorization to access transmitted information.

Augmented reality device 410 sharing information may be labeled as source augmented reality device. Similarly, augmented reality device 420 receiving shared information may be labeled destination augmented reality device. In some embodiments, the labels may be roles assigned to augmented reality devices allowing software applications (e.g., Applications 334 of FIG. 3A) of only source augmented reality device to share information. Augmented reality device 410 and 420 may interchange roles by making information sharing requests. In some embodiments, augmented reality devices 410 and 420 may simultaneously have source and destination roles.

Infrared transceivers 412 and 422 may be placed at the center of the augmented reality device (as shown in FIG. 4) to allow communication only when augmented reality devices 410 and 420 are facing each other horizontally or at a minimal angle. In some embodiments, augmented reality devices 410 and 420 may have more than one infrared transceiver placed on the device. Multiple infrared transceivers may be placed at the left and right end of the device. Each of the infrared transceivers may have separate or overlapping fields of view with other infrared transceivers and can cumulatively increase the field of view enabling an augmented reality device to be connected with devices farther away and at angles not reachable by a single infrared transceiver.

In some embodiments, the source augmented reality device communicating with the receiving augmented reality device transmits an infrared signal. The infrared signal may contain a unique identifier in the request to be connected. In some embodiments, the receiving augmented reality device may communicate with external sources to determine if the source augmented reality device is in the blocked list of devices. The blocked list of devices may be a list of unique identifiers. The list may include ranges of identifiers that are representative of a region, organization, or a group. In some embodiments the pre-evaluation may not be done prior to communicative coupling. In some embodiments, the source and destination devices connected may result in the receiving device sending a secret code shared by the source device as part of the initial communication. This can help ensure that the source device is indeed sharing the data with the augmented reality device.

In some embodiments, the augmented reality device may require an infrared signal to be sent at regular intervals to maintain the communication coupling. In some embodiments, the connection between augmented reality devices 410 and 420 may end after sharing the required information. For example, a passenger wearing augmented reality device 410 may share their ticket with augmented reality device 420 worn by gate agent when boarding a plane for verification purposes. The connection between augmented reality devices 410 and 420 may end after sharing the ticket information. In some embodiments, the infrared transceiver can reinitiate a new connection on termination of a previously established connection. In some embodiments, the augmented reality device may be communicating with multiple devices by sequentially transmitting connection requests. In some embodiments, augmented reality device 410 may continuously transmit infrared signals at regular intervals irrespective of the presence of augmented reality devices in its field of view.

The infrared transceiver 412 or 422 may be connected to a servo motor (e.g., servo motor 380 of FIG. 3A) to rotate the transceiver to increase the field of view of the augmented reality device. The servo motor 380 may be activated only when searching for devices to which to connect. In some embodiments, the servo motor 380 may be activated when communicating with multiple people in order to maintain the multiple connections via transmitting infrared signals at regular intervals. In some embodiments, the servo motor 380 activation time matches the timeout period for a connection between augmented reality devices. In some embodiments, infrared transceiver 412 may stop transmitting infrared signal when augmented reality device 410 has reached a capacity for simultaneously maintaining connections and sharing information with other augmented reality devices. The augmented realty device 410 capacity for simultaneously connections may be limited by hardware used in the augmented reality device. In some embodiments, a user of augmented reality device 410 may set the limit on maximum number of simultaneous connections to have good interaction experience.

Figure 5A:
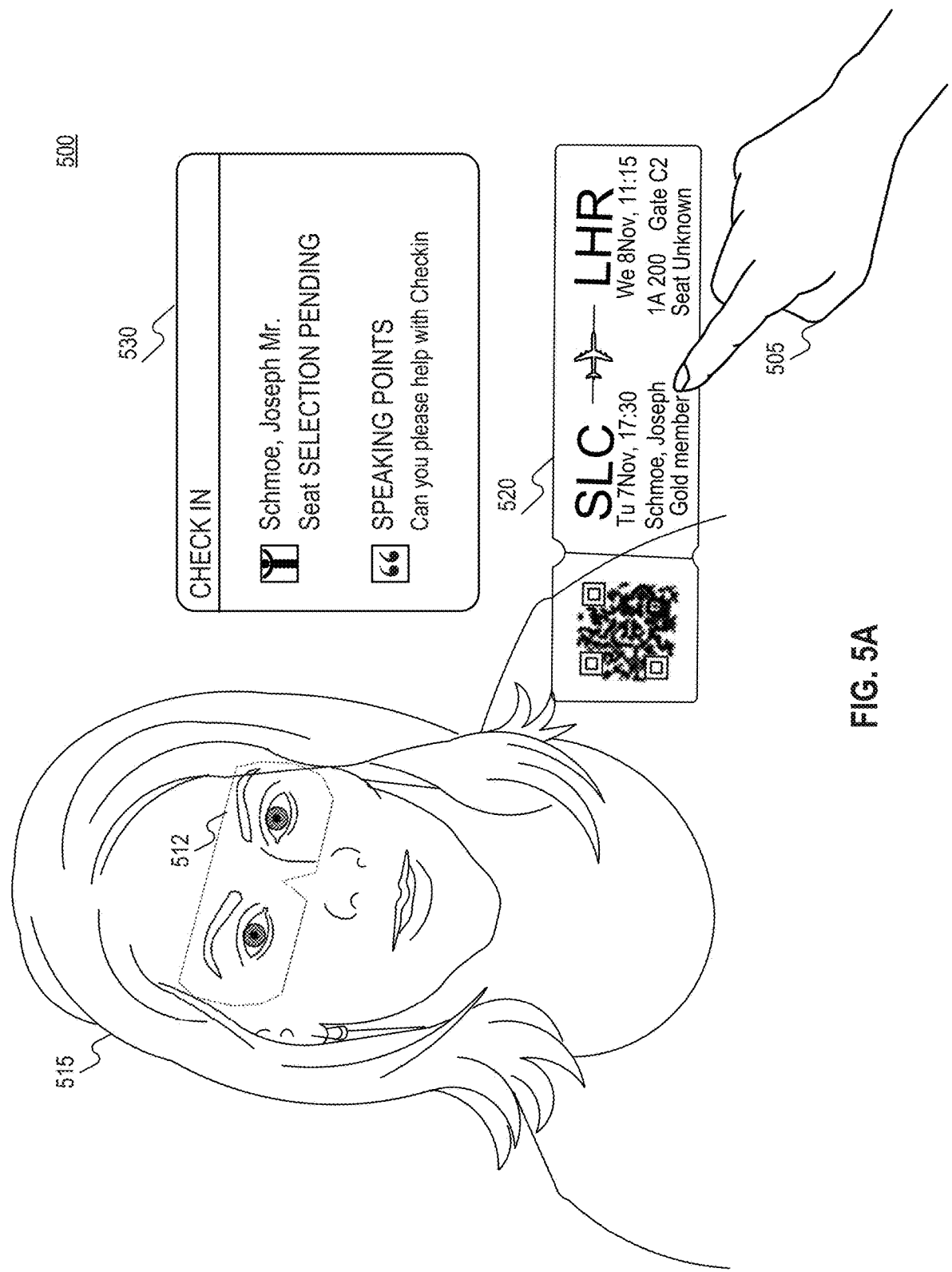
FIGS. 5A and 5B are diagrams of exemplary user interfaces of augmented reality devices sharing information, consistent with embodiments of the present disclosure.
Figure 5B:
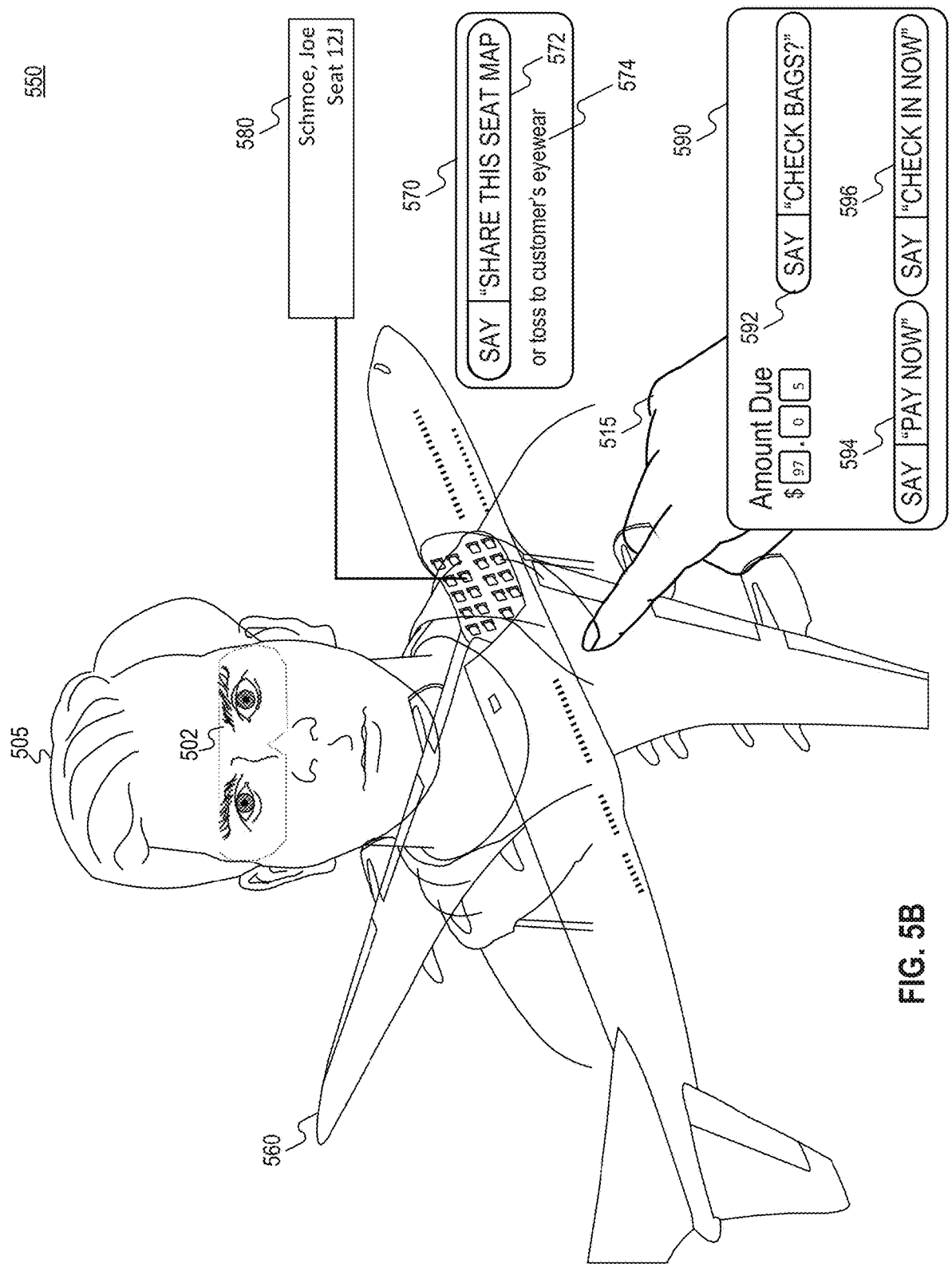

FIGS. 5A and 5B are diagrams of exemplary user interactions of augmented reality devices sharing information, consistent with embodiments of the present disclosure. FIG. 5A is an exemplary interaction to share a copy of the information between two augmented reality devices. FIG. 5B, is an exemplary interaction of sharing information by allowing access to information and collaboratively updating the information. For example, the interaction can be between a first user 515 wearing a first augmented reality device 512 having a first field of view 500 (as shown in FIG. 5A) and a second user 505 wearing a second augmented reality device 502 having a second field of view 550 (as shown in FIG. 5B).

In FIG. 5A, information is shared between two connected augmented reality devices by providing a copy of the information. Copy of the information may include the actual information or a location of information to access and make a temporary copy. Second augmented reality device 502 worn by second user 505 (shown in FIG. 5B) may be connected with first augmented reality device 512 worn by first user 515 (shown in FIG. 5A) when they face each other to communicate verbally and to share information. Augmented reality devices 502 and 512 may be similar in configuration to augmented reality devices 410 and 420 (shown in FIG. 4) and device 300 (shown in FIG. 3). Additional digital information may be shared by communicatively coupling the augmented reality devices worn by users 505 and 515 in communication. Digital information ticketing information 520) may be shared manually by a second user 505 or automatically accessed by first augmented reality device 512 (shown in FIG. 5A) after the augmented reality devices are connected. Permission to share or access information may depend on the unique identity of augmented reality devices 502 and 512. In some embodiments, permission to access and share information is based on the personal identity like facial and voice signatures and not the device. This could be to avoid an unauthorized individual to use the augmented reality device sharing or accessing information without the required permissions.

Information may be shared automatically or by selecting the information to be shared. In some embodiments, the information destination device may initiate a request to share information. For example, in interaction 500, a passenger 505 may share the purchased ticket 520 with check-in agent 515 by selecting it from user interface displayed on the second augmented reality device 502 (shown in FIG. 5B). Information to be shared may depend on the location of the information source device or the identity and location of the information destination device. Information to be shared may also depend on the words spoken by the user sharing information. For example, first augmented reality device 512 worn by check-in agent 515 (shown in FIG. 5A) in check-in area of an airport facility on being connected with second augmented reality device 505 worn by passenger 505 (shown in FIG. 5B) could share the identity or the location of the first augmented reality device 512, resulting in ticketing information 520 being displayed on second augmented reality device 502 of the second user 505. In some embodiments, first user 515 (shown in FIG. 5A) wearing augmented reality device 512 may manually initiate a request for information to be shared based on conversation with second user 505 wearing second augmented reality device 502 (shown in FIG. 5B). For example, passenger 502 on saying "Can you please help with check-in" as suggested on user interface window 530 displayed on augmented reality device 505 can result in check-in agent 515 manually making a request for ticketing information 520 to be shared by passenger 505. In response to the check-in agent 515 requesting and receiving ticketing information 520, check-in agent 515 may help with the check-in process by sharing the seat chart as will be described in detail in FIG. 5B.

Two connected augmented reality devices may share information with each other by taking turns. Users 505 and 515 wearing connected augmented reality device 502 and 512 may view the shared information individually on their augmented reality devices or view the shared information together. Multiple users viewing the shared information may allow the shared information to be manipulated by multiple users at the same time.

In FIG. 5B, users 505 and 515 are viewing the same shared information 560 (flight seat map) and collaboratively updating it. Updates to shared information can be viewed simultaneously. Updates to the shared information may be indicated by visual indicators. Visual indicators may be visible for a temporary period of time until the updated shared information is viewed by everyone with access to shared information. For example, a check-in agent 515 may share a seat map with passenger 505 through first augmented reality device 512 connected with second augmented reality device 502 and worn by passenger 505 (shown in FIG. 5B). Passenger 505 can view the shared seat map 560 on his second augmented reality device 502. Either passenger 505 or check-in agent 515 can update the selected seat, and the updated shared information is visible on both augmented reality devices 502 and 512 simultaneously and is indicated using visual indicator 580. Information can be shared between two communicatively augmented reality devices 502 and 512 by verbal communication or gestures as suggested in user interface 570. For example, check-in agent 515 can share the seat map information 560 with passenger 505, who shared the ticketing information 510 earlier in order to select a seat as part of check-in process. Check-in agent 515 can share the seat map information 560 by uttering the words "SHARE THIS SEAT MAP" 572 or following the gesture indicated by hint 574.

Connected augmented reality devices 502 and 512 may provide fields of views to allow their respective users to view simultaneously shared information and other information specific to the user of the augmented reality device. For example, while passenger 505 views shared seat map information 560, passenger 505 may not have the other information specific to the agent 515 (such as user interface 590 listing additional interactions for check-in agent 515 to perform). In some embodiments, a user of an augmented reality device can select to share partial or all the information with a connected augmented reality device. First augmented reality device 512 worn by first user 515 (shown in FIG. 5A) can share all the information at the same time. In some embodiments, the shared information including live updates may be viewed by a user, but the user cannot interact with the information. For example, a check-in agent 515 may share the complete user interface (seat map information 560 and user interface 590) but not allow for any interaction from passenger 505 to update the shared information. The check-in agent can update the seat shown by visual indicator 580 or invoke other interactions to check bags, pay any pending fees or complete the check in process using commands "CHECK BAGS" 592, "PAY NOW" 594 or "CHECK IN NOW" 596. Check-in agent 515 may share the updated ticketing information 520 with passenger 505 on completion of the requested check-in process. On completion of the requested task the connected augmented reality devices 502 and 505 may be automatically disconnected in order for check-in agent 505 to check-in other passengers.

Figure 6:
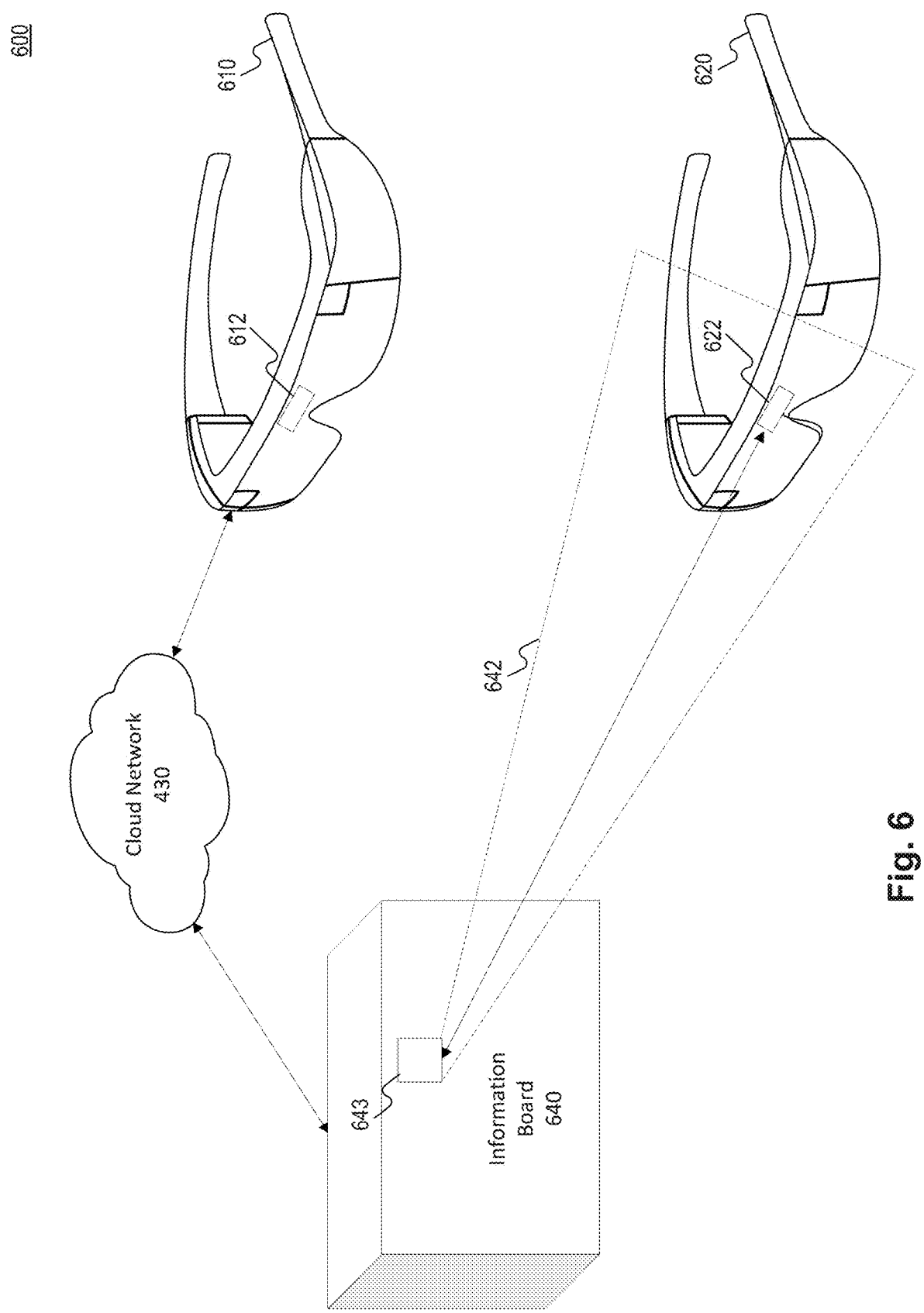
FIG. 6 is an exemplary augmented reality information sharing system accessing information from a non-augmented reality device, consistent with the embodiments of the current disclosure.

FIG. 6 is an exemplary augmented reality information sharing system, accessing information from a non-augmented reality device, consistent with the embodiments of the current disclosure. The exemplary augmented reality information sharing system 600 includes augmented reality devices 610 and 620 and an information board 640. The augmented reality information sharing system may further include a cloud network 430.

Information board 640 may share information with one or more augmented reality devices simultaneously. The information simultaneously shared with multiple augmented reality devices may be the same content. For example, a digital advertisement board 640 may be connected with augmented reality devices 610 and 620 to share an advertisement or coupon information. In some embodiments, digital information board 640 may customize the advertising information shared with each of augmented reality devices 610 and 620.

Information board 640 can connect with augmented reality device 630 when the augmented reality device 620 is in a field of view 642 of information board 640. Information board 640 field of view 642 is determined by the infrared transmitter 642 of information board 640. Augmented reality devices connected with information board 640 may not be in field of view 642 for sharing information. For example, augmented reality device 610 previously connected with information board 640 can continue to receive information even though it is no longer in field of view 642 of information board 640.

Information board 640 may share information directly with augmented reality device 620 but may use a cloud network 430 to share information with augmented reality device 610. Information board 640 may determine the requirement of cloud network 430 based on whether augmented reality device is in field of view and thus can use a local network for communication. Augmented reality devices 610 and 620 connected with information board 640 may share information manually or automatically. For example, augmented reality devices 610 and 620 may share usage statistics of the information shared by information board 640. Usage statistics may include any purchases, clicks, or other interactions performed on the advertisement and product/service coupon information shared by information board 640.

FIG. 7 is a flowchart of an exemplary method 700 for information sharing between two augmented reality devices (augmented reality devices 410 and 420 of FIG. 4), consistent with embodiments of the present disclosure.

In step 710, a source device (e.g., augmented reality device 410 of FIG. 4, Information Board 640 of FIG. 6) may detect a target augmented reality device (e.g., augmented reality device 420 of FIG. 4, augmented reality device 620 of FIG. 6). For example, with reference to FIG. 4, augmented reality device 410 acting as the source device may identify a augmented reality device 420 (shown in FIG. 4) acting as the target device, by continuously transmitting infrared signals using an infrared transmitter (e.g., infrared transmitter 370 of FIG. 3A) and may receive a confirmation of receipt of the transmitted infrared signal from augmented reality device 420 containing an identifier representing the infrared sensor (e.g., infrared sensor 346 of FIG. 3A) of augmented reality device 420. Infrared sensor 346 (shown in FIG. 3A) of augmented reality device 420 on sensing an infrared signal transmitted by infrared transmitter 370 of augmented reality device 410 may review the request wrapped in the infrared signal to determine if it has the permission to accept the request. The wrapped request may also contain a unique identifier representing the infrared transmitter 370 (shown in FIG. 3A). Infrared sensor 346 can capture transmitted infrared signal only reaching the sensor at zero degrees or a certain limited angle away from zero degrees.

In step 720, the source augmented reality device (in some instances, with the help of the augmented reality system 140 of FIG. 1) verifies whether it is connected with the target augmented reality device connected for sharing information. For example, augmented reality device 410 (shown in FIG. 4) acting as source augmented reality device may verify whether augmented reality device 420 (shown in FIG. 4) is a valid target augmented reality device as part of establishing connection with augmented reality device 420. Augmented reality device 410, on receiving a confirmation receipt of an infrared signal may transmit another infrared signal after a pre-set amount of time. If the augmented reality device 410 does not receive a confirmation receipt or the confirmation receipt contains a different identifier, the augmented reality device 410 may consider the augmented reality device 420 identified in step 710 to not be a valid target augmented reality device.

In some embodiments, the validity of a target augmented reality device is determined based on the type of requests the target augmented reality device accepts. For example, in an airport facility, an augmented reality device may be worn by a parent and a child, but the child's augmented reality device even though is in the field of view of the source augmented reality device may not be able to share any ticketing information unlike the augmented reality device worn by parent.

In some embodiments, the validity of the target augmented reality device is determined based on the proximity of the device. For example, augmented reality device 410 (shown in FIG. 4) may transmit infrared signals for a specified period of time and may receive confirmation receipts for one or more of the transmitted signals. Augmented reality device 410 may then evaluate the time taken to receive a confirmation receipt for each signal to determine the closest augmented reality device. The closest augmented reality device may be the valid target augmented reality device. If the source and target destination augmented reality devices are not connected due to various reasons, method can proceed to end 799.

If, however, the source and target augmented reality devices are connected, at step 730, the source augmented reality device may share its identifier with the connected target augmented reality device. The identifier shared by source augmented reality device (e.g., augmented reality device 410 of FIG. 4) may be different from identifier shared in step 710. The identifier may be an assigned network address allowing for transmitting data and links to data to the target augmented reality device (e.g., augmented reality device 420 of FIG. 4). Target augmented reality device may share identifier assigned to the device in the network on receiving the source augmented reality device identifier.

In step 740, the source augmented reality device establishes an information transfer request to share and receive information. Information request may be a request for a specific information to be shared as a copy or provided access via a link. In some embodiments, source augmented reality device (e.g., augmented reality device 410 of FIG. 4) may establish an information transfer request by mentioning the type of information it wants the target augmented reality device (e.g., augmented reality device 420 of FIG. 4) to share. For example, augmented reality device 512 worn by check-in agent 515 (shown in FIG. 5A) acting as source augmented reality device may establish an information transfer request for ticketing information 510. The information transfer request may only mention the type, as the augmented reality device 512 may not know specific travel itinerary details. Similarly, a check-in agent 515 helping with a code share transfer flight may request for a specific flight ticket information instead of type of information.

In step 750, the source augmented reality device receives a response for the established information transfer request. The response to the information transfer request may be an identifier of the device or an acceptance or rejection. In some embodiments, the response may be a conditional acceptance restricting the transfer to certain types of information, a certain amount of information, or a certain time to share information. The response to the information request may be a path (e.g., file system path or URL) to where the information requested from the target augmented reality device will be transferred.

In step 760, it is determined whether the received response includes an acceptance or rejection from the augmented reality device. If the request was rejected, method proceeds to end 799.

If, however, the request was accepted, in step 770, the target augmented reality device may begin transferring information to the source augmented reality device through a wireless network in order to share directly or provide access to a shared storage. In some embodiments, target augmented reality device (e.g., augmented reality device 420 of FIG. 4) may share multiple times after being connected with source augmented reality device (e.g., augmented reality device 410 of FIG. 4). In some embodiments, target augmented reality device once connected with source augmented reality device may continue to share information with source augmented reality device even when it is no longer in source augmented reality device's field of view. For example, check-in agent 515 wearing augmented reality device 512 (shown in FIG. 5A) may continue to transfer flight status updates to augmented reality device 502 worn by passenger 505 (shown in FIG. 5B) on a standby ticket. The connection between source and target augmented reality devices may end after a set period of time or a set number of transfers. In some embodiments, connection may end, and devices may stop sharing based on a manual request by a user of one of the augmented reality devices. For example, check-in agent 515 wearing augmented reality device 512 (shown in FIG. 5A) connected with augmented reality device 502 worn by passenger 505 (shown in FIG. 5B) may request the connection to be terminated on completion of check-in process and payment of fees. On completion of transferring information for sharing, the method 700 ends in step 799.

Although the previous systems are described in terms of a travel context, the system can be used for many different domains. The features used and data that is incorporated can be based on the specific domain in which the disclosed embodiments are deployed.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a hardware processor core of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer readable medium(s) may be utilized. The computer readable medium may be a non-transitory computer readable storage medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM, EEPROM or Flash memory), an optical fiber, a cloud storage, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, IR, etc., or any suitable combination of the foregoing.

Computer program code for carrying out operations for example embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's augmented reality device partly on the user's augmented reality, as a stand-alone software package, partly on the user's augmented reality device and partly on a remote augmented reality system or entirely on the remote computer or server. In the latter scenario, the remote augmented reality system may be connected to the user's augmented reality device through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable storage medium storing instructions that are executable by one or more processors of a source augmented reality device to cause the source augmented reality device to perform a method comprising:
    detecting, using an infrared device of the source augmented reality device, a presence of a receiving augmented reality device;
    in response to the detection, establishing a connection over a wireless network between the source augmented reality device and the receiving augmented reality device; and
    sharing, via the connection over the wireless network, information for displaying in a field of view of the source augmented reality device and a field of view of the receiving augmented reality device.

2. The non-transitory computer readable storage medium of claim 1, wherein establishing the connection between the source augmented reality device and the receiving augmented reality device further comprises:
    transmitting a source augmented reality device identifier to the receiving augmented reality device;
    receiving an identifier of the receiving augmented reality device;
    transmitting an information transfer request to share information for displaying in the field of view of the source augmented reality device and the field of view of the receiving augmented reality device; and
    receiving an acceptance response to the information transfer request.

3. The non-transitory computer readable storage medium of claim 1, wherein sharing information for displaying in the field of the view of the source augmented reality device and the field of view of the receiving augmented reality device further comprises:
    transferring information between the source augmented reality device and receiving augmented reality device through the wireless network.

4. The non-transitory computer readable storage medium of claim 1, wherein the source augmented reality device is simultaneously connected to two or more receiving augmented reality devices.

5. The non-transitory computer readable storage medium of claim 1, wherein detecting the presence of the receiving augmented reality device further comprises:
    transmitting continuously an infrared signal using an infrared transmitter of the infrared device of the source augmented reality device; and
    receiving a confirmation from an infrared device of the receiving augmented reality device on capturing the transmitted infrared signal.

6. The non-transitory computer readable storage medium of claim 5, wherein transmitting continuously the infrared signal further comprises:
    stopping transmission of infrared signal when the source augmented reality device establishing the connection with receiving augmented reality devices reaches a threshold number; or stopping transmission of infrared signal when the number of receiving augmented reality devices sharing the information with the source augmented reality device reaches a threshold.

7. The non-transitory computer readable storage medium of claim 5, wherein the source augmented reality device receives the confirmation of the transmitted infrared signal when the receiving augmented reality device is in the field of view of the source augmented reality device.

8. The non-transitory computer readable storage medium of claim 7, wherein establishing the connection between the source augmented reality device and the receiving augmented reality device further comprises:
checking after a pre-set amount of time if the receiving augmented reality device is still in the field of view of the source augmented reality device.

9. The non-transitory computer readable storage medium of claim 7, wherein the receiving augmented reality device is in the field of view of the source augmented reality device when the angle of the infrared device of the source augmented reality device relative to the infrared device of the receiving augmented reality device is lower than angle of acceptance threshold.

10. The non-transitory computer readable storage medium of claim 9, wherein the angle of the infrared device of the source augmented reality device relative to the infrared device of the receiving augmented reality device can be greater than the angle of acceptance threshold post establishing the connection between the source augmented reality device and the receiving augmented reality device.

11. A method performed by a source device to share information with a receiving augmented reality device, the method comprising:
detecting, using an infrared device of the source augmented reality device, a presence of the receiving augmented reality device;
in response to the detection, establishing a connection over a wireless network between the source augmented reality device and the receiving augmented reality device; and
sharing, via the connection over the wireless network, information for displaying in a field of view of the source augmented reality device and a field of view of the receiving augmented reality device.

12. The method of claim 11, wherein establishing the connection between the source augmented reality device and the receiving augmented reality device further comprises:
transmitting a source augmented reality device identifier to the receiving augmented reality device;
receiving an identifier of the receiving augmented reality device;
transmitting an information transfer request to share information for displaying in the field of view of the source augmented reality device and the field of view of the receiving augmented reality device; and
receiving an acceptance response to the information transfer request.

13. The method of claim 11, wherein detecting the presence of the receiving augmented reality device further comprises:
transmitting continuously an infrared signal using an infrared transmitter of the infrared device of the source augmented reality device; and
receiving a confirmation from an infrared device of the receiving augmented reality device on capturing the transmitted infrared signal.

14. A source augmented reality device configured to share information with a receiving augmented reality device comprising:
an infrared device;
a memory storing instructions; and
one or more processors configured to execute the instructions to cause the source augmented reality device to perform:
detecting, using the infrared device of the source augmented reality device, a presence of the receiving augmented reality device;
in response to the detection, establishing a connection over a wireless network between the source augmented reality device and the receiving augmented reality device; and
sharing, via the connection over the wireless network, information for displaying in at least one of a field of view of the source augmented reality device and a field of view of the receiving augmented reality device.

15. The source augmented reality device of claim 14, wherein the detecting of the presence of the receiving augmented reality device involves the one or more processors configured to execute the instructions to cause the source augmented reality device to further perform:
transmitting continuously an infrared signal using an infrared transmitter of the infrared device of the source augmented reality device; and
receiving a confirmation from an infrared device of the receiving augmented reality device on capturing the transmitted infrared signal.

16. The source augmented reality device of claim 15, wherein the one or more processors are configured to execute the instructions to cause the source augmented reality device to further perform:
receiving the confirmation of the transmitted infrared signal when the receiving augmented reality device is in the field of view of the source augmented reality device.

17. The source augmented reality device of claim 16, wherein the source augmented reality device is in the field of view of the receiving augmented reality device when the angle of the infrared device of the source augmented reality device relative to the infrared device of the receiving augmented reality device is lower than angle of acceptance threshold.

18. The source augmented reality device of claim 17, wherein the infrared device includes a first infrared device positioned on the left end of the source augmented reality device and a second infrared device positioned on the right end of the source augmented reality device.

19. The source augmented reality device of claim 18, wherein the one or more processors are configured to execute the instructions to cause the source augmented reality device to further perform:
cumulatively adding the angle of acceptance threshold using the first and second infrared devices.

20. The source augmented reality device of claim 14, wherein the infrared device is placed in middle of the source augmented realty device.

* * * * *